United States Patent [19]
Gellert

[11] Patent Number: 5,843,361
[45] Date of Patent: Dec. 1, 1998

[54] INJECTION MOLDING MANIFOLDS WITH MELT CONNECTOR BUSHING

[76] Inventor: Jobst Ulrich Gellert, 7A Prince Street, Georgetown, Ontario, Canada, L7G 2X1

[21] Appl. No.: 958,511

[22] Filed: Oct. 27, 1997

Related U.S. Application Data

[62] Division of Ser. No. 692,704, Aug. 6, 1996, Pat. No. 5,720,995.

[30] Foreign Application Priority Data

Jul. 5, 1996 [CA] Canada .................................. 2180603

[51] Int. Cl.⁶ .................................................. B29C 45/22
[52] U.S. Cl. ................................... 264/297.2; 264/328.8; 264/328.14; 425/572; 425/588
[58] Field of Search ............................ 264/297.2, 328.8, 264/328.14, 328.15; 425/572, 573, 588, 547, 548

[56] References Cited

U.S. PATENT DOCUMENTS

| | | | |
|---|---|---|---|
| 4,219,323 | 8/1980 | Bright et al. | 425/572 |
| 4,579,520 | 4/1986 | Gellert | 425/549 |
| 4,634,366 | 1/1987 | Brun et al. | 264/328.15 |
| 4,761,343 | 8/1988 | Gellert | 425/547 |
| 4,793,795 | 12/1988 | Schmidt et al. | 425/549 |
| 4,810,184 | 3/1989 | Gellert et al. | 425/548 |
| 4,818,217 | 4/1989 | Schmidt et al. | 264/328.15 |
| 5,032,078 | 7/1991 | Benenati | 264/328.15 |
| 5,284,436 | 2/1994 | Gellert | 264/328.15 |
| 5,299,928 | 4/1994 | Gellert | 264/328.15 |
| 5,318,434 | 6/1994 | Gellert | 264/328.15 |
| 5,334,006 | 8/1994 | Hepler et al. | 264/328.15 |
| 5,366,369 | 11/1994 | Gellert | 425/549 |
| 5,536,165 | 7/1996 | Gellert | 425/549 |
| 5,609,893 | 3/1997 | Eastwood | 264/328.15 |
| 5,707,664 | 1/1998 | Mak | 264/328.15 |
| 5,720,995 | 2/1998 | Gellert | 425/572 |

FOREIGN PATENT DOCUMENTS

95/00312  1/1995  WIPO .

*Primary Examiner*—Jill L. Heitbrink
*Attorney, Agent, or Firm*—Dalesman & Company

[57] ABSTRACT

Multi-cavity injection molding apparatus having two heated manifolds interconnected by a connector bushing all extending in a common plane. A threaded portion of the connector bushing is screwed into a threaded opening in one manifold and a nonthreaded portion of the connector bushing is received in a nonthreaded opening in the other manifold. The nonthreaded portion of the connector bushing fits in the nonthreaded hole in the other manifold tightly enough to prevent melt leakage, but is still able to slide sufficiently in the opening to accommodate thermal expansion and contraction of the heated nozzles relative to the cooled mold in which they are mounted and located. In one embodiment, the connector bushing is made of a material such as a beryllium copper alloy having a greater coefficient of expansion than the steel manifolds so it can be easily installed and then expand to produce this fit when heated to the operating temperature.

1 Claim, 3 Drawing Sheets

5,843,361

INJECTION MOLDING MANIFOLDS WITH MELT CONNECTOR BUSHING

This is a divisional of application Ser. No. 08/692,704 filed Aug. 6, 1996 now Pat. No. 5,720,995.

BACKGROUND OF THE INVENTION

This invention relates generally to injection molding and more particularly to apparatus wherein a melt conveying connector bushing extending between two heated manifolds mounted in a common plane has a threaded end received in one manifold and a nonthreaded end received in the other manifold.

As shown in the applicant's U.S. Pat. No. 4,761,343 which issued Aug. 2, 1988, interconnecting heated injection molding manifolds to provide a system having a larger number of nozzles is well known. The disclosure of U.S. Pat. No. 4,761,343 is incorporated herein by reference as further explanation of the background and state of the art prior to the present invention. However, the system shown in U.S. Pat. No. 4,761,343 has a bridging manifold spanning a number of support manifolds. However, this requires the manifolds to extend in two different planes which is a disadvantage in applications such as stack molding where there is no room for a bridging manifold. It is also known to interconnect two heated manifolds in a common plane but this has the disadvantage in prior designs that movement of the manifolds due to thermal expansion and contraction makes it difficult to avoid nozzle misalignment. U.S. Pat. No. 4,219, 323 to Bright et al. which issued Aug. 26, 1980 shows two heated manifolds extending in a common plane in which a very rough attempt is made to overcome the problem of thermal expansion and contraction by cutting expansion slots crossways in a connector link. In addition to being very imprecise, this solution has the disadvantage that a separate bushing is required inside the link to prevent melt leakage out the expansion slots. WO 95/00312 to Wolff published Jan. 5, 1995 shows a nozzle expandable joint formed by two pipe ends surrounded by a cooling ring which is even less relevant.

SUMMARY OF THE INVENTION

Accordingly, it is an object of the present invention to at least partially overcome the disadvantages of the prior art by providing an elongated manifold connector bushing with one threaded end which is received in one manifold and a nonthreaded end which is received in the other manifold with a sliding fit to allow for thermal expansion and contraction.

To this end, in one of its aspects, the invention provides injection molding apparatus having spaced first and second heated manifolds interconnected by an elongated connector bushing. The first and second heated manifolds and the connector bushing mounted in a common plane in a mold with a melt passage extending from the first heated manifold through the connector bushing into the second heated manifold, and have the improvement wherein the connector bushing has a first portion extending from one end, a second portion extending from the other end, and a melt bore extending therethrough from said one end to said other end. The first portion is received in a first opening aligned with the melt passage in the first heated manifold, the second portion is received in a second opening aligned with the melt passage in the second heated manifold, and at least one of the first and second portions of the connector bushing fits in one of the first and second openings in the heated manifolds to allow the portion of the connector bushing to slide sufficiently in the openings in the second heated manifold to allow for thermal expansion and contraction of the manifolds and connector bushing without allowing leakage of pressurized melt flowing through the melt passage.

In another of its aspects, the invention further provides a method of conveying melt from a central inlet to a plurality of cavities in a mold, comprising the following steps. Firstly, conveying the melt through a melt passage through a central heated manifold. Secondly, conveying the melt received from the central manifold through a central bore of an elongated connector bushing having a first portion extending from one end, a second portion extending from the other end, and the melt bore extending therethrough from the one end to the other end. The first portion is received in a first opening aligned with the melt passage in the central manifold and the second portion is received in a second opening aligned with a melt passage in a second heated manifold. One of the first and second portions of the connector bushing fits in one of the first and second openings in the heated manifolds to allow the one portion of the connector bushing to slide sufficiently in the one of the openings to allow for thermal expansion and contraction of the manifolds and connector bushing without allowing leakage of pressurized melt flowing through the melt passage. Thirdly, conveying the melt received from the connector bushing through a melt passage through a nozzle manifold extending in a common plane with the central manifold and the connector bushing. The melt passage branches in the nozzle manifold into a plurality of branches. Finally, conveying the melt received from each branch of the melt passage through the nozzle manifold through a central bore of a nozzle mounted adjacent the nozzle manifold with the central bore of the nozzle leading to a gate extending to one of the cavities.

Further objects and advantages of the invention will appear from the following description taken together with the accompanying drawings.

DETAILED DESCRIPTION OF THE INVENTION

Figure 1:
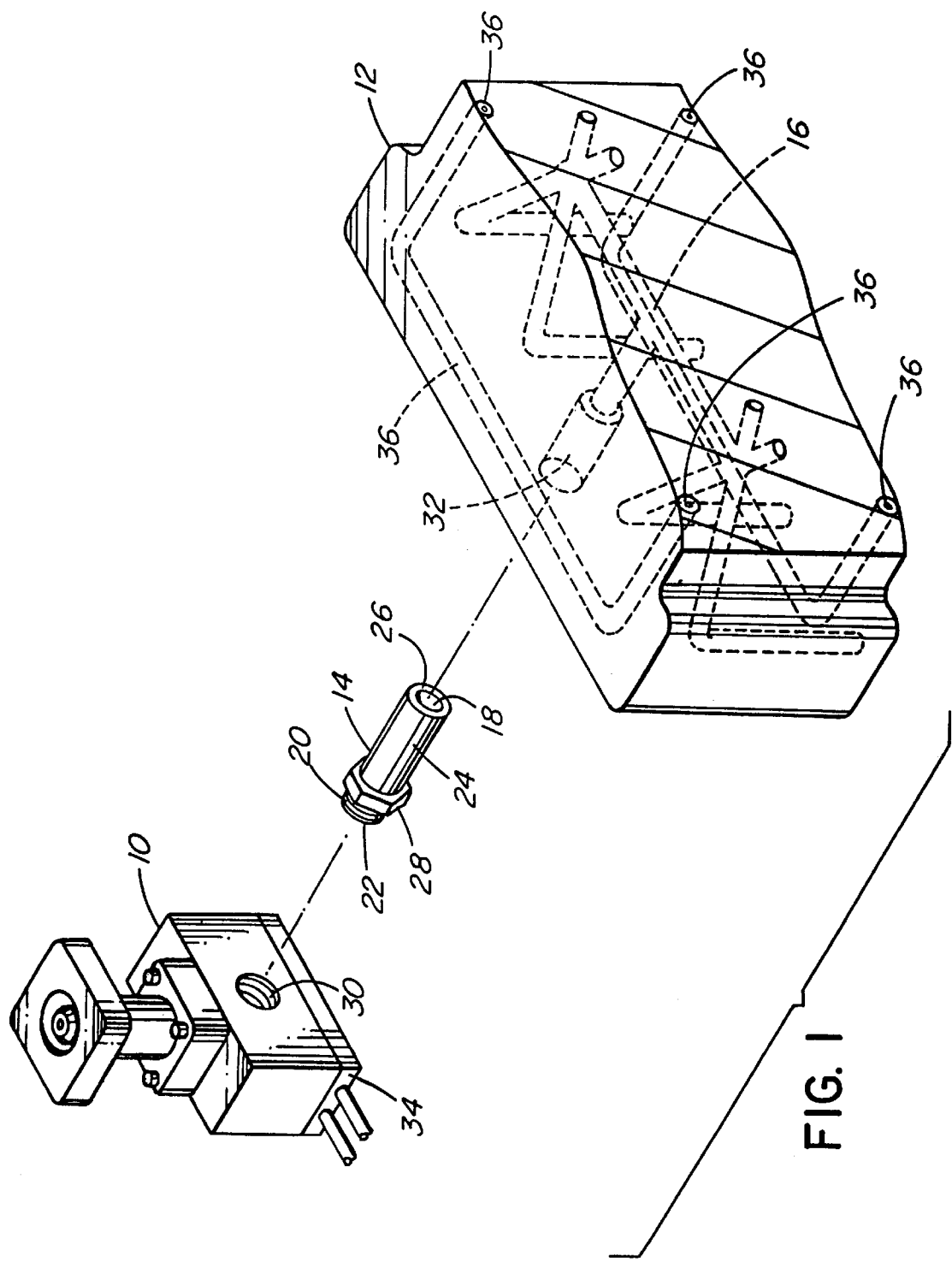
FIG. 1 is an isometric view of a portion of an injection molding system showing a connector bushing according to one embodiment of the invention in position to be mounted between two heated manifolds.

Reference is first made to FIG. 1 which shows portions of two heated manifolds such as a central entry manifold 10 and a nozzle manifold 12 which are to be mounted in a mold in a common plane. The central manifold 10 and nozzle manifold 12 are to be interconnected by an elongated connector bushing 14 according to a preferred embodiment of the invention with a hot runner melt passage 16 extending from the central manifold 10 to the nozzle manifold 12 through a central bore 18 in the connector bushing 14. While this connector bushing 14 is shown interconnecting a central manifold 10 and a nozzle manifold 12, in other embodiments it can be used to interconnect any two heated manifolds extending in a common plane, whether or not they are part of a larger system involving other connector bushings and heated nozzles. The connector bushing 14 has a threaded cylindrical portion 20 extending from one end 22, a nonthreaded cylindrical portion 24 extending from the other end 26, and a hexagonal flange 28 extending around the connector bushing 14 between the threaded and nonthreaded portions 20, 24.

Figure 2:
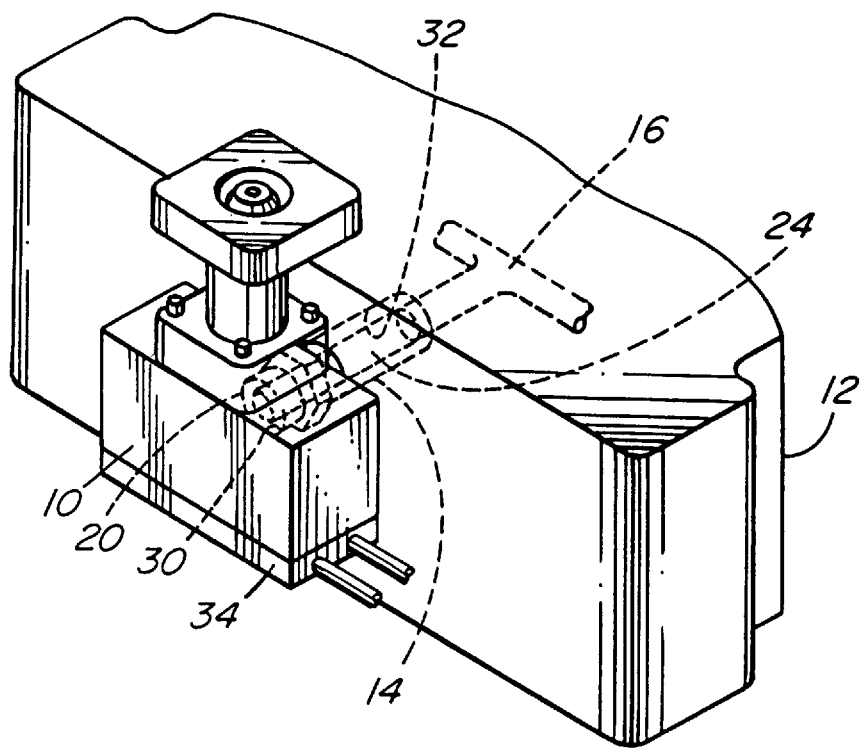
FIG. 2 is a similar view after the connector bushing has been mounted in place interconnecting the two manifolds.
Figure 3:
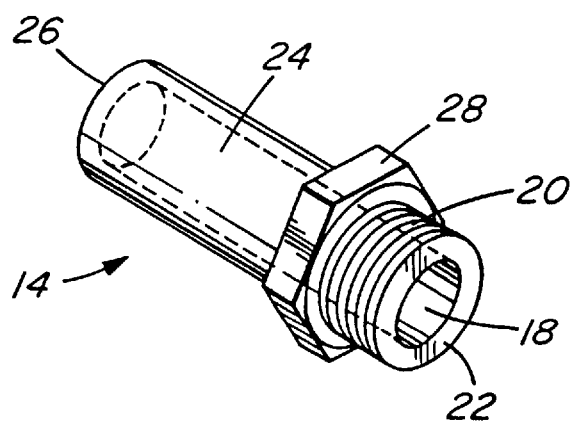
FIG. 3 is an isometric view of the connector bushing seen in FIGS. 1 and 2.

As seen in the assembled position in FIG. 2, the threaded portion 20 of the connector bushing 14 is screwed into a matching threaded cylindrical opening 30 in the central manifold 10 and the nonthreaded portion 24 is received in a matching nonthreaded cylindrical opening 32 in the nozzle manifold 12. Both the threaded opening 30 in the central manifold 10 and the nonthreaded opening 32 in the nozzle manifold 12 are in alignment with the melt passage 16 extending through the connector bushing 14 from the central manifold 10 to the nozzle manifold 12. The central manifold 10 and the nozzle manifold 12 are mounted in a mold (not shown) to extend in a common plane with the connector bushing 14. As can be seen, the melt passage 16 branches in the nozzle manifold 12 to convey the melt to a number of spaced nozzles (not shown) extending from the nozzle manifold 12. The central nozzle manifold 10 is heated by a heater plate 34 and the nozzle manifolds have integral electrical heating elements 36 extending therein with a predetermined configuration.

The nonthreaded portion 24 of the connector bushing 14 fits in the nonthreaded opening 32 in the nozzle manifold 12 tightly enough to prevent leakage of pressurized melt from the melt passage 16, but is still able to slide sufficiently in the opening 32 to accommodate thermal expansion and contraction of the heated manifolds 10, 12 and the connector bushing 14. In a typical example the nonthreaded portion 24 has an outer diameter of 25.00 mm. and the nonthreaded opening 32 has a diameter of 25.01 mm. In this embodiment, the manifold 10, 12 are made of steel, but the connector bushing 14 is made of a beryllium copper alloy having a greater coefficient of expansion so the connector bushing 14 can be easily installed and will then expand into a tighter fit in the opening 32 when it is heated to the operating temperature. In other embodiments, the nozzles 10, 12 and the connector bushing 14 can all be made of the same material and preloaded to provide the desired fit.

In use, usually two nozzle manifolds 12 extending in opposite directions from a central manifold 10 are mounted in a common plane in a cooled mold (not shown). Electrical power is applied to the heating elements 34, 36 to heat the manifolds 10, 12 and the connector bushing 14 to a desired operating temperature. The mold (not shown) in which the manifolds 10, 12 and the connector bushing 14 are mounted is cooled by pumping cooling water through cooling conduits in a conventional manner. The two manifolds 10, 12 are usually centrally located in place in the mold and the thermal expansion of the heated manifolds 10, 12 and connector bushing 14 relative to the cooled mold is accommodated by the nonthreaded portion 24 of the connector bushing 14 sliding in the nonthreaded opening 32 in the nozzle manifold 12. Of course, the connector bushing 14 can be reversed with the threaded portion 20 received in the nozzle manifold 12 and produce the same results. Pressurized melt from a molding machine (not shown) flows through the melt passage 16 to fill a number of cavities according to a predetermined injection cycle.

Figure 4:
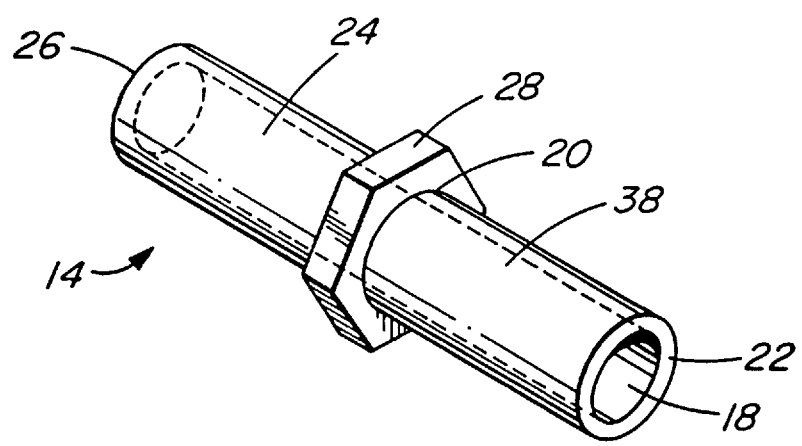
FIG. 4 is an isometric view of the connector bushing according to another embodiment of the invention.

Reference is now made to FIG. 4 which shows a connector bushing 14 according to another embodiment of the invention. As most of the elements are the same as those described above, elements common to both embodiments are described and illustrated using the same reference numerals. As can be seen in FIG. 4, in this embodiment the connector bushing 14 has a nonthreaded portion 38 extending from the one end 22 as well as the nonthreaded portion 24 extending from the other end 26. Of course, when using this embodiment the opening 30 in the central manifold 10 is nonthreaded as well as the cylindrical opening 32 in the nozzle manifold 12. Both of the nonthreaded portions 24, 38 of the connector bushing 14 fit in the respective nonthreaded openings 30, 32 in the central manifold 10 and a nozzle manifold 12 tightly enough to prevent leakage of pressurized melt from the melt passage 16, but still able to slide in the openings to accommodate thermal expansion and contraction of the heated manifolds 10, 12 and the connector bushing 14.

While the description of the injection molding apparatus with a connector bushing 14 interconnecting two heated manifolds 10, 12 has been given with respect to preferred embodiments, it will be evident that various other modifications are possible without departing from the scope of the invention as understood by those skilled in the art and as defined in the following claims. For instance, one end of the connector bushing 14 can be retained in one of the openings 30, 32 in the manifolds by being brazed in place or by a retaining ring.

The embodiments of the invention in which an exclusive property or privilege is claimed is defined as follows:

1. A method of conveying melt from a central inlet to a plurality of cavities in a mold, comprising the steps of (a) conveying said melt through a melt passage through a central heated manifold, (b) conveying said melt received from the central manifold through a central bore of an elongated connector bushing having a first cylindrical portion extending from a first end, a second cylindrical portion extending from a second end, with said melt bore extending therethrough from said first end to said second end, the first portion being received in a first cylindrical opening aligned with the melt passage in the central manifold, the second portion being received in a second cylindrical opening aligned with a melt passage in a heated nozzle manifold, at least one of the first and second cylindrical portions of the connector bushing fitting in one of the first and second cylindrical openings in the heated manifolds to allow the at least one cylindrical portion of the connector bushing to slide sufficiently in said one of the cylindrical openings to allow for thermal expansion and contraction of the manifolds and connector bushing without allowing leakage of pressurized melt flowing through the melt passage, (c) conveying said melt received from the connector bushing through a melt passage through the nozzle manifold extending in a common plane with the central manifold and the connector bushing, the melt passage branching in the nozzle manifold into a plurality of branches, and (d) conveying said melt received from each branch of the melt passage through the nozzle manifold through a central bore of a nozzle mounted adjacent the nozzle manifold with the central bore of said nozzle leading to a gate extending to one of said cavities.

* * * * *